Nov. 4, 1969  J. J. JONAS  3,476,741
METHOD FOR TREATING POLYSACCHARIDES IN THE PRESENCE
OF AN OXYGEN ACCEPTING AGENT
Filed Jan. 20, 1967
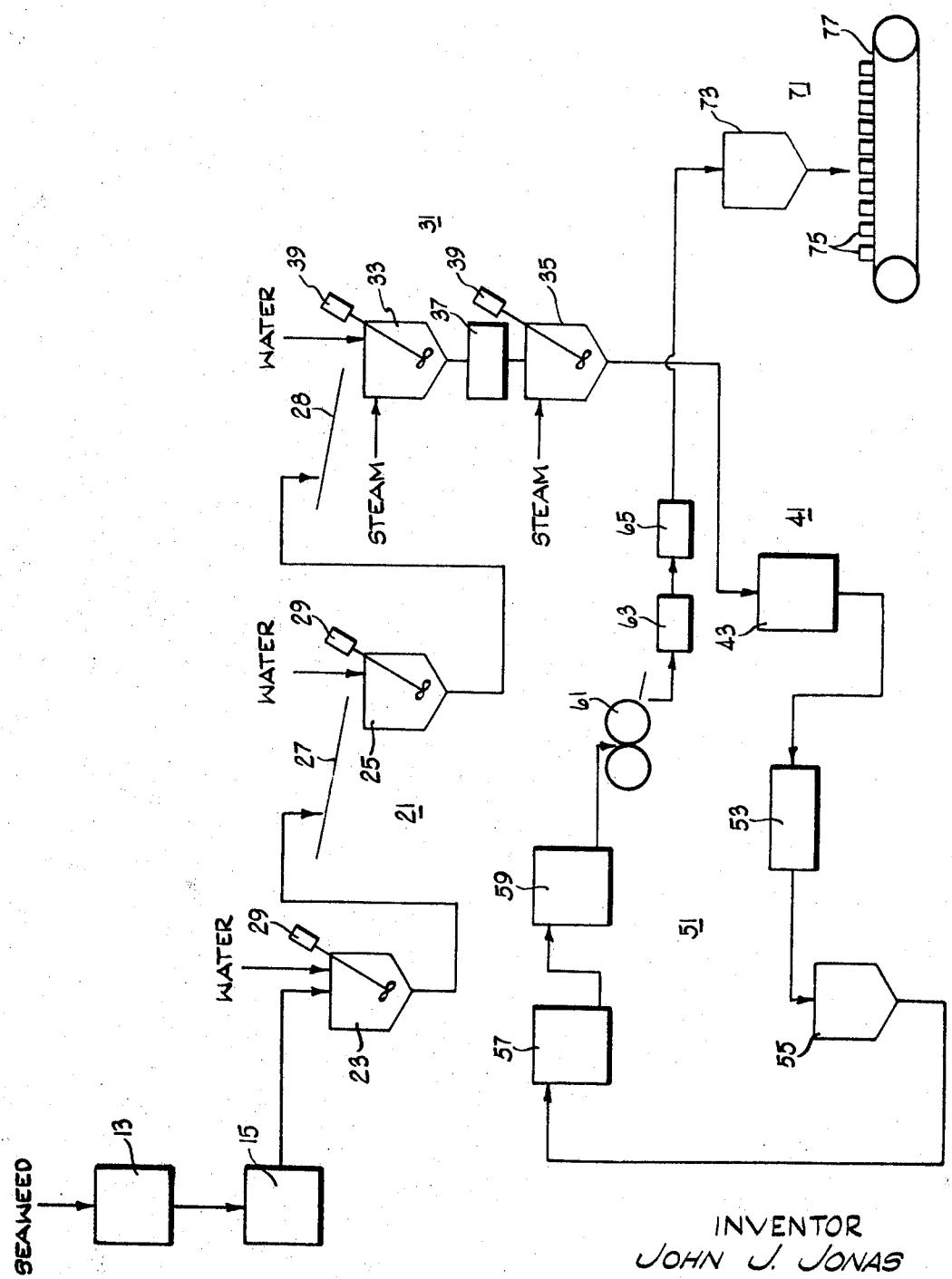
INVENTOR
JOHN J. JONAS
BY Anderson, Luedeka, Fitch, Even, & Tabin ATTORNEYS

United States Patent Office 3,476,741
Patented Nov. 4, 1969

3,476,741
METHOD FOR TREATING POLYSACCHARIDES IN THE PRESENCE OF AN OXYGEN ACCEPTING AGENT
John J. Jonas, Winnetka, Ill., assignor to National Dairy Products Corporation, New York, N.Y., a corporation of Delaware
Filed Jan. 20, 1967, Ser. No. 610,542
Int. Cl. C08b 19/00
U.S. Cl. 260—209                    5 Claims

ABSTRACT OF THE DISCLOSURE

A method for treating polysaccharides obtained from the Gigartinaceae family of the Rhodophyceae class of seaweeds wherein the polysaccharide is heated in an aqueous alkaline medium in the presence of an oxygen accepting agent.

---

The present invention relates generally to the treatment of polysaccharides contained in, or extracted from, various species of red-purple seaweed (class Rhodophyceae) and in particular relates to the polysaccharides of certain marine plants of the Gigartinaceae family of the class Rhodophyseae and to a method ofr the treatment thereof.

Polysaccharides extracted from the various genera of the Gigartinaceae and Solieriaceae families of the Rhodophyceae class of seaweed are variously identified as extracts, gums, mucilaginous matter and carrageenan. The present invention relates to extracts of the various genera of the Gigartinaceae family and in so far as possible, the polysaccharide extract of these genera will be referred to as carrageenan throughout the following disclosure. It should be understood that the term carrageenan as used herein shall not include extract from the Solieriaceae family.

Various processes are known whereby carrageenan is extracted from the precursive seaweed. In a typical procedure for the manufacture of dried carrageenan, dried seaweed is chopped, washed with fresh water and an aqueous slurry of the chopped seaweed is prepared. The carrageenan is then extracted from the seaweed at an elevated temperature in the presence of an alkaline material, e.g., calcium hydroxide, sodium hydroxide, potassium hydroxide or ammonium hydroxide. The resultant carrageenan solution thus obtained is concentrated and separated from the insoluble components present in the extracted seaweed slurry by filtering. Dried carrageenan is then recovered from the solution by roll drying or by alcohol precipitation followed by drying. The carrageenan may then be ground into a fine powder if desired.

Carrageenan can be used to form thermally reversible aqueous gels whose strength and gelling temperature are dependent upon specifically associated cations, particularly potassium and ammamonium. A further distinctive property of carrageenan is its ability, at relatively low concentrations, to alter the protein in milk. The relative ability of a particular carrageenan to alter the milk protein is referred to as its "milk reactivity."

In this connection, the dominant units in the polysaccharides of the Rhodophyceae class of sea plants are the hexoses, D-Galactose and its 3.6-anhydro form. Carrageenan is characterized as being hexose salts of sulphate esters having a ratio of sulphate to hexose units close to unity. It has been determined that carrageenan contains two distinct polysaccharide components referred to as kappa and lambda. As determined by X-ray diffraction, in kappa carrageenan there are 3,6-anhydro-D-galactopyranose units linked through C4 to D-galactopyranose 4-sulfate units with a glycosidic linkage at C3. Lambda carrageenan has a backbone chain of (1,3)-linked alpha-D-galactopyranose 4-sulphate units.

It has been further determined that the gelation behavior and milk reactivity of carrageenan is attributable primarily to the kappa component. While gelation behavior is dependent also on associated cations and their concentrations, the milk reactivity of a particular carrageenan is dependent upon the level of the kappa component contained in the mixture of kappa and lambda components of the polysaccharide. Since the level of the kappa polysaccharide component of carrageenan is dependent upon the particular species of sea plant from which the carrageenan is extracted and varies even within a single species, the gelation behavior and milk reactivity of carrageenan is not constant but is subject to wide variation.

Accordingly, it would be desirable to provide an extract of carrageenan which has improved milk reactivity and gelation behavior. It would also be desirable to provide carrageenan with a known and constant degree of milk reactivity and gelation behavior that is not subject to variation and is not dependent upon the sea plant species from which the carrageenan is extracted.

In this connection, it is known as taught by U.S. Letters Patent No. 3,094,517 and from a British publication, Marshall S. M., "British Seaweeds and the Preparation of Agar," London, Charles Birchall & Sons, 1949, pp. 73–83, to increase the milk reactivity of carrageenan by heating the carrageenan while in contact with various levels of an alkaline material, such as potassium hydroxide or calcium hydroxide. It has been theorized that such treatment results in the rearrangement of part of the lambda component of the carrageenan to a structure similar to that of the kappa component and thus results in an increase in the milk reactivity and gelation behavior of the carrageenan to the extent that such rearrangement occurs. Such alkaline treatment methods have not, however, been wholly successful in that the total potential improvement in milk reactivity has not been obtained. Furthermore, at the temperature and alkaline concentration conditions hereinbefore required to effect milk reactivity improvement, the polysaccharide molecule is subject to partial depolymerization and deleterious side reactions.

Accordingly, it is a principal object of the present invention to provide an improved carrageenan composition which has increased milk reactivity and aqueous gelation behavior. It is a further object of the present invention to provide a method for improving the milk reactivity of carrageenan. It is also an object of the present invention to provide an improved method of manufacturing carrageenan which provides carrageenan having improved milk reactive properties.

Other objects and advantages of the present invention will become apparent from a study of the following detailed description and of the accompanying drawing, in which is shown a schematic diagram of a process that may be used in the practice of the present invention.

In general, a process embodying various features of the present invention comprises treating carrageenan in an alkaline medium while controlling the level of oxygen in contact with the carrageenan to thereby provide carrageenan having improved properties.

A system which may be used for treatment of carrageenan according to the practice of this invention is illustrated in the flow sheet of the single drawing. The system comprises a seaweed preparation section 11, a wash section 21, a heat treatment section 31, a pressure treatment section 41, a finishing section 51 and a filling section 71.

The seaweed preparation section 11 comprises a grinder 13 and a blending tank 15. The wash section 21 comprises a first wash tank 23, a second wash tank 25, successive vibrating screens 27 and 28, and agitators 29. The heat treatment section 31 comprises a first cook tank 33, a second cook tank 35, pulverizer 37 and agitators 39. The pressure treatment section 41 comprises a pressure tank 43. The finishing section 51 comprises filter 53, filtrate collection tank 55, evaporation concentrator 57, heat exchanger 59, drying rolls 61, pulverizer 63 and grinder 65. The filling section 71 comprises hopper 73, containers 75 and conveyor 77. Various pumps and valves (not shown) are used to control the flow of the various materials within the system.

The process of the present invention may be practiced on carrageenan which has been extracted from its precursive seaweed or it may be applied to the seaweed during the extraction process. For reasons of economy it is generally preferred to incorporate the method of the present invention in a system for extracting carrageenan from the seaweed.

In this connection, in order to obtain most satisfactory results from the desired end product it has been found advantageous to subject the particular seaweed which is to be used to a selection procedure. Such procedure is a standard practice in the industry resulting from the recognition that different seaweeds, even within the same recogcan give somewhat different end products depending upon seasonal variations, geographic location of harvesting and grading processes.

After the selection process, the selected seaweed is washed, in accordance with standard procedures, to free it from sand, grit and shells which normally come in harvested seaweed. In this connection, the seaweed is first ground in grinder 13 and is then blended in blender 15, whereupon it is introduced into wash tank 23 to which water has been previously added. After thorough blending of the particulate moss with the wash water in wash tank 23, the seaweed slurry is passed over vibrating screen 27 into wash tank 25 whereupon the wash procedure is repeated. The wash water is then drained from the seaweed by passing the seaweed slurry over vibrating screen 28 prior to introduction of the seaweed into the cook tank 33. Thus, the seaweed goes into cook tank 33 in particulate form.

The drained particulate seaweed is cooked in the presence of a suitable alkaline material, for the reasons heretofore discussed. A preferred alkaline material is calcium hydroxide, added in the form of calcium oxide (lime). Calcium oxide is preferred for reasons of economy and because it is substantially insoluble and may be readily separated from the carrageenan duing subsequent filtration. While other alkaline materials, such as potassium hydroxide, sodium hydroxide and ammonium hydroxide are equally suitable to effect rearrangement of the carrageenan, they are substantially more soluble than calcium hydroxide and therefore must be recovered from the filtrate containing the carrageenan by more complicated precipitation techniques.

Before placing the drained particulate seaweed in cook tank 33, calcium oxide, at levels to be hereinafter discussed, is introduced into the water in the cook tank and the mixture is heated to boiling. In this connection, heating of the water in the cook tank prior to introduction removes part of the dissolved oxygen. However, in accordance with the present invention, an oxygen accepting agent is added to the mixture of calcium oxide and water prior to placing the drained particulate seaweed in the cook tank to further reduces the oxygen level. The oxygen accepting agent acts to reduce the level of oxygen in contact with the particulate seaweed during cooking of the seaweed to effect extraction of carrageenan. While not intending to be bound by any theory it is believed that the use of oxygen accepting agents in accordance with the present invention to reduce the level of oxygen in contact with the particulate seaweed during the extraction process prevents any substantial depolymerization of the polysaccharide.

Suitable oxygen accepting agents include sodium hydrosulfite, sodium thiosulfite, sodium bisulfite, sodium hydrosulfide, sodium formaldehyde sulfoxylate and sodium sulfite. Sodium sulfite is generally preferred where considerations of taste, odor or edibility are important in the extracted carrageenan.

The particulate seaweed after being introduced into a near boiling or boiling calcium oxide solution in the first cook tank 33 to provide a seaweed slurry, is passed through a suitable grinder into a second cook tank 35. After leaving the cook tanks, the seaweed slurry is introduced in pressure tank 43. The seaweed slurry is heated in pressure tank 43 until a temperature in the range of 220°–240° F. is reached. At the upper limit of this temperature range 10 p.s.i.g. pressure will be built up in the pressure tank.

From the pressure tank 43, the seaweed slurry at an elevated temperature passes through a suitable filter. A pressure may be maintained during filtration. The filtrate is then concentrated in an evaporator 57 and the concentrated filtrate is heated in heat exchanger 59. The concentrated filtrate is then roll dried on drying rolls 61 and the dried product is passed through a suitable pulverizing mill, such as a hammer mill, located at the output of the driers. The dry product is then passed through a grinder 65. Moisture may be added to bring the level of moisture in the carrageenan product up to equilibrium moisture of about 11 percent and the product is packaged in drums 75.

As usual hereinafter, all percentages, unless otherwise specified, are by weight of the air dried, particulate seaweed. The seaweed has moisture of about 10 to 15 percent, unless otherwise specified. Also, as used hereinafter, all references to calcium oxide are to the commercially available technical grade material which is 80–96 percent pure, i.e., contains 80–96 weight percent of calcium oxide.

In accordance with the present invention, extraction of carrageenan from the particulate seaweed is performed in the presence of from about 4.0 to about 8.2 percent of calcium oxide. The calcium oxide is preferably added in two steps. From about 1 percent to about 5 percent of calcium oxide is added to the first cook tank 33 prior to introduction of the washed particulate seaweed. Additional calcium oxide at a level of from about 1 percent to about 7 percent is then added to the resultant heated seaweed slurry in the second cook tank 35.

Sodium sulfite is added during the cooking step in cook tanks 33 and 35 at a total level of at least about 0.004 percent by weight of the seaweed slurry. It should be understood that the level of addition of sodium sulfite is related to the total level of oxygen in the seaweed slurry during cooking. Such oxygen may be present in the water prior to introduction of the seaweed to form the slurry or may be introduced during the cooking step. In general, the sodium sulfite is added at a level of at least about 0.004 percent by weight of the slurry to provide a sufficient level of sodium sulfite, to scavenge oxygen present or anticipated to be introduced in the slurry. Amounts of sodium sulfite substantially in excess of that required to scavenge the oxygen are not generally deleterious. However, no additional advantages are achieved at levels of sodium sulfite above about 0.10 percent by weight of the seaweed slurry.

The sodium sulfite is preferably added at various times during the cooking step for most effective control of the oxygen. From about 0.001 percent to about 0.01 percent of the sodium sulfite is added to the first cook tank 33 before introduction of the particulate seaweed into the water-CaO mixture to insure that the residual oxygen level in the water-CaO mixture has been eliminated. Additional sodium sulfite at a level of from about 0.001 percent to about 0.01 percent is added to the seaweed slurry after it passes through grinder 37 into second cook tank 35. Additional sodium sulfite at a level of from about 0.001 percent to about 0.1 percent is again added to the seaweed slurry in cook tank 35 just prior to the introduction of the seaweed slurry into pressure tank 43.

The following examples further illustrate various specific features of the present invention but are intended in no way to limit the scope of the invention which is defined in the appended claims.

EXAMPLE I

Selected varieties of Chondus Crispus seaweed, hereinafter referred to as Irish moss, were ground in a grinder 13 and blended in tank 15. Three hundred and seventy-five pounds of the air-dried seaweed (moisture content 13.6 percent) was introduced into wash tank 23. Four hundred gallons of water were then added and the mixture was agitated for a period of 15 minutes. The slurry of Irish moss was then passed over vibrating screen 27 into the second wash tank 25 and 400 gallons of water were added. The mixture was agitated for a period of 15 minutes and was then passed over vibrating screen 28. The drained particulate Irish moss was then added to cook tank 33 into 1100 gallons of water which had been heated to 200° F. after which 28 pounds of technical grade calcium oxide (containing 87.5% CaO) had been added. Just prior to introduction of the particulate Irish moss, 1½ pounds of sodium sulfite were added. The resultant mixture was agitated to form a slurry and held at a temperature of 200° F. in cook tank 33 for a period of 45 minutes.

The slurry was then passed through a Rietz disintegrator into a second cook tank 35. Immediately after introduction into the second cook tank 35 one pound of sodium sulfite was added. The slurry was maintained at a temperature of 200° F. in second cook tank 35. Just prior to removal of the slurry from cook tank 35 one-half pound of sodium sulfite was added. The slurry was then pumped to pressure tank 43. Heat was applied to pressure tank 43 until the temperature of the Irish moss slurry was raised to 240° F., i.e., a pressure of 10 p.s.i.g. The Irish moss slurry was maintained in pressure tank 43 for cooking.

The Irish moss slurry was then pumped at a pressure of 10 p.s.i.g. through a filter press 53. The filtrate was collected in tank 55 wherein carbon dioxide was bubbled until the pH reached a level of 9.0. The filtrate was then removed to an evaporator 57 and concentrated. The filtrate concentrate was then passed through heat exchanger 59 where it was heated to a temperature of 170° F. The filtrate was then dried on drying rolls 61 to provide a yield of 125 pounds of carrageenan. The carrageenan was ground by passing through a hammer mill 63. The ground carrageenan was then further ground by passing through a mill. The carrageenan product was then packaged in drums 75 by means of the filling hopper 73 and the conveyor 77.

Tests were performed on the dried recovered carrageenan product to determine the viscosity of a one weight percent solution of the carrageenan in water, the gel strength of an aqueous gel formed from 2 weight percent of the carrageenan in water and the viscosity of a chocolate milk drink containing the carrageenan at a level of 0.03 weight percent. The results of these tests are reported in Table I.

EXAMPLE II

Carrageenan was produced in accordance with the procedures of Example I with the exception that the washed, particulate Irish moss was added to a cold mixture of water and technical grade calcium oxide which was subsequently brought to a temperature of 200° F. The results relating to aqueous viscosity, aqueous gel strength and chocolate milk viscosity are shown in Table I. The yield was 125 pounds of carrageenan.

EXAMPLE III

Carrageenan was produced in accordance with the procedures of Example I with the exception that sodium sulfite was not added during the cooking step and with the further exception that the washed, particulate Irish moss was added to a cold mixture of water and technical grade calcium oxide which was subsequently brought to a temperature of 200° F. The results relating to aqueous viscosity, aqueous gel strength and chocolate milk viscosity are shown below in Table I. The yield was 122 pounds of carrageenan.

EXAMPLE IV

Carrageenan was produced in accordance with the procedures of Examples I through III with the exception that the carrageenan was recovered by alcohol precipitation, followed by drying, rather than by roll drying. The results relating to aqueous viscosity, aqueous gel strength and chocolate milk viscosity are shown below in Table II. The sample produced in accordance with the procedure of Example I is identified as I(a), that of Example II as II(a), and that of Example III as III(a).

The advantages of the use of an oxygen accepting agent in accordance with the practice of the present invention are clearly shown in Tables I and II. For each of the parameters of aqueous viscosity, aqueous gel strength and milk reactivity, an improvement is obtained when carageenan is extracted with control of oxygen during the cooking step. The single exception is an apparent increase in milk reactivity for carrageenan produced by the process of Example III wherein an oxygen accepting agent was not used during the cooking step but wherein the water was boiled prior to introduction of the Irish moss to remove as much oxygen as possible. The slight differences noted in milk reactivity may be due to some breakdown of the carrageenan during the roll drying process since the advantages of the use of an oxygen accepting agent are particularly evident when the carrageenan is recovered by alcohol precipitation followed by air drying as shown in Table II.

The process of the present invention for improving carrageenan as described herein is subject to numerous modifications as will be apparent to one skilled in the art. However, no limitations are intended except as set out in the following claims.

TABLE I.—(ROLL DRIED)

| Example No. | Sodium sulphite used | Water boiled before addition of Irish moss | Viscosity of 1 weight percent water solution (Centipoises) | Gel strength of 2 weight percent water solution (Gm./cm.²) | Viscosity of chocolate milk at 0.03 weight percent addition (Seconds, flow cup) |
|---|---|---|---|---|---|
| I | Yes | Yes | 138 | 232 | 40.07 |
| II | Yes | No | 111 | 278 | 40.07 |
| III | No | No | 60 | 172 | 38.9 |

TABLE II.—(ALCOHOL PRECIPITATED)

| Example No. | Sodium sulphite used | Water boiled before addition of Irish moss | Viscosity of 1 weight percent water solution (Centipoises) | Gel strength of 4 weight percent water solution (Gm.;cm.²) | Viscosity of chocolate milk at 0.03 weight percent addition (Seconds, flow cup) |
|---|---|---|---|---|---|
| I (a) | Yes | Yes | 414 | 261 | 54. |
| II (a) | Yes | No | 275 | 215 | 54.5 |
| III (a) (control) | No | No | 122 | 184 | 44.7 |

What is claimed is:

1. In a process for the treatment of a polysaccharide of seaweeds of the Gigartinaceae family of the class Rhodophyceae wherein the polysaccharide is heated in an aqueous medium in the presence of an alkaline material, the improvement comprising carrying out the treatment of said polysaccharide in the presence of an oxygen accepting material selected from the group consisting of sodium hydrosulfite, sodium thiosulfite, sodium bisulfite, sodium hydrosulfide, sodium formaldehyde sulfoxylate and sodium sulfite so as to increase the milk reactivity and aqueous gelation characteristics of said polysaccharide.

2. A process in accordance with claim 1 comprising the further improvement of heating said aqueous medium to a temperature of at least about 190° F. prior to combining said polysaccharide with said aqueous medium.

3. A process in accordance with claim 1 wherein said oxygen accepting material is sodium sulfite.

4. A process in accordance with claim 3 wherein said sodium sulfite is present at a level of at least about 0.004 percent by weight of the mixture of seaweed and extraction water.

5. A process in accordance with claim 1 wherein the treatment of said polysaccharide in the presence of an oxygen-accepting material is effected during extraction of said polysaccharide from its precursive seaweed.

References Cited

UNITED STATES PATENTS

| | | | |
|---|---|---|---|
| 3,094,517 | 6/1963 | Stanley | 260—209 |
| 3,146,200 | 8/1964 | Goldstein et al. | 260—209 |
| 3,176,003 | 3/1965 | Stancioff | 260—209 |
| 3,236,833 | 2/1966 | Gordon et al. | 260—209 |

ELBERT L. ROBERTS, Primary Examiner

J. R. BROWN, Assistant Examiner

PO-1050
(5/69)

UNITED STATES PATENT OFFICE
CERTIFICATE OF CORRECTION

Patent No. 3,476,741          Dated   November 4, 1969

Inventor(s)  John J. Jonas

It is certified that error appears in the above-identified patent and that said Letters Patent are hereby corrected as shown below:

Column 1, line 26, "Rhodophyseae" should read "Rhodophyceae"

Column 1, line 26, "ofr" should read "for"

Column 1, line 58, "ammamonium" is misspelled in both the patent and the specification. It should read "ammonium"

Column 1, line 65, "3.6" should read "3,6"

Column 3, line 24, "recog-" should read "genus"

Column 3, line 66, "reduces" should read "reduce"

Column 4, line 29, "usual" should read "used"

Table I,  column 5, "(Gm./cm.$^2$)" should read "gm/cm$^2$"

Table I,  column 5, "278" should read "218"

Table II, column 5, "4 weight percent" should read "2 weight percent"

Table II, column 5, "(Gm.;cm.$^2$)" should read "gm/cm$^2$"

Table II, column 6, "54." should read "54.7"

SIGNED AND
SEALED

AUG 4 - 1970

(SEAL) 
Attest:

Edward M. Fletcher, Jr.
Attesting Officer

WILLIAM E. SCHUYLER, JR.
Commissioner of Patents